(12) United States Patent
Cataniag

(10) Patent No.: US 11,546,476 B2
(45) Date of Patent: Jan. 3, 2023

(54) TRANSFER OF CELLULAR SERVICES FROM A POSTPAID SUBSCRIBER TO A PREPAID SUBSCRIBER

(71) Applicant: T-Mobile USA, Inc., Bellevue, WA (US)

(72) Inventor: Arnold Cataniag, Issaquah, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 19 days.

(21) Appl. No.: 16/924,922

(22) Filed: Jul. 9, 2020

(65) Prior Publication Data

US 2022/0014631 A1 Jan. 13, 2022

(51) Int. Cl.
*G06Q 40/04* (2012.01)
*H04M 15/00* (2006.01)
*G06Q 20/28* (2012.01)
*G06Q 20/12* (2012.01)
*H04M 17/00* (2006.01)
*G06Q 30/06* (2012.01)

(52) U.S. Cl.
CPC ........ *H04M 15/735* (2013.01); *G06Q 20/127* (2013.01); *G06Q 20/28* (2013.01); *G06Q 30/0601* (2013.01); *G06Q 40/04* (2013.01); *H04M 17/35* (2013.01)

(58) Field of Classification Search
None
See application file for complete search history.

(56) References Cited

U.S. PATENT DOCUMENTS

| 2003/0045267 A1* | 3/2003 | Himmel | H04M 15/00 455/406 |
| 2016/0088459 A1* | 3/2016 | Jiang | H04L 12/1407 455/406 |
| 2017/0187888 A1* | 6/2017 | Shukla | G06Q 20/3223 |
| 2017/0272930 A1* | 9/2017 | Jiang | H04M 15/09 |

FOREIGN PATENT DOCUMENTS

WO WO-2005125230 A1 * 12/2005 ............. G06Q 20/14

* cited by examiner

*Primary Examiner* — David P Sharvin
(74) *Attorney, Agent, or Firm* — Loeb & Loeb LLP

(57) ABSTRACT

A method and system for transferring access to cellular services from a postpaid subscriber account to a prepaid subscriber account are disclosed. A central postpaid system receives a request to transfer cellular services from the postpaid subscriber account to the prepaid subscriber account. The cellular services are transferred to a central prepaid system for the prepaid subscriber account. The amount of the transferred cellular services is deducted from the postpaid subscriber account stored in the central postpaid system. A monetary amount from the prepaid subscriber account is credited to the postpaid subscriber account for the transferred amount of cellular services.

19 Claims, 2 Drawing Sheets

TRANSFER OF CELLULAR SERVICES FROM A POSTPAID SUBSCRIBER TO A PREPAID SUBSCRIBER

BACKGROUND

The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

A telecommunication system may provide cellular services to both prepaid subscribers and postpaid subscribers. Prepaid subscribers pre-pay for cellular services such as voice call minutes, SMS/text, and data. When a prepaid subscriber uses up all of their voice call minutes, SMS/text, and/or data, they must go to a mobile provider to buy more cellular services. Postpaid subscribers, on the other hand, are billed once a month or once a billing period for the cellular services provided to them during the month/billing period, and the cellular services are automatically replenished every month/billing period regardless of whether the postpaid subscriber used-up all of the cellular services from the prior month/billing period. In addition, in some telecommunications systems, it is a "use it or lose it" postpaid subscription model. Thus, if the postpaid subscriber does not use all of their cellular services for the current month/billing period, the excess cellular services do not rollover to the next month/billing period and are forfeited.

Therefore, there exists a need for a cellular service exchange within a telecommunication system that enables prepaid subscribers to buy cellular services such as voice call minutes, SMS/text, and/or data from postpaid subscribers, and enables postpaid subscribers to sell and transfer their cellular services to prepaid subscribers. Such an exchange gives prepaid subscribers more flexibility as to where or how they reload their account, e.g., family/friends/colleagues with a postpaid account v. mobile store/provider, and gives postpaid subscribers the ability to monetize their excess or unused cellular services. Prepaid subscribers can also reload their accounts based on how much they can afford or need (e.g., $1, $2, $3, etc. or 1 minute, 2 minute, 3 minute, etc.), rather than in set increments. The cellular service exchange also provides flexibility in the type (e.g., voice call minutes, SMS/text, and/or data) and cost of the cellular service(s) the postpaid subscriber wishes to sell.

SUMMARY

A method for transferring cellular services from a postpaid subscriber account to a prepaid subscriber account is disclosed. A central postpaid system receives a request to transfer cellular services from the postpaid subscriber account to the prepaid subscriber account. The cellular services are transferred to a central prepaid system for the prepaid subscriber account. The amount of the transferred cellular services is deducted from the postpaid subscriber account stored in the central postpaid system. A monetary amount from the prepaid subscriber account is credited to the postpaid subscriber account for the transferred amount of cellular services.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Figure 1:
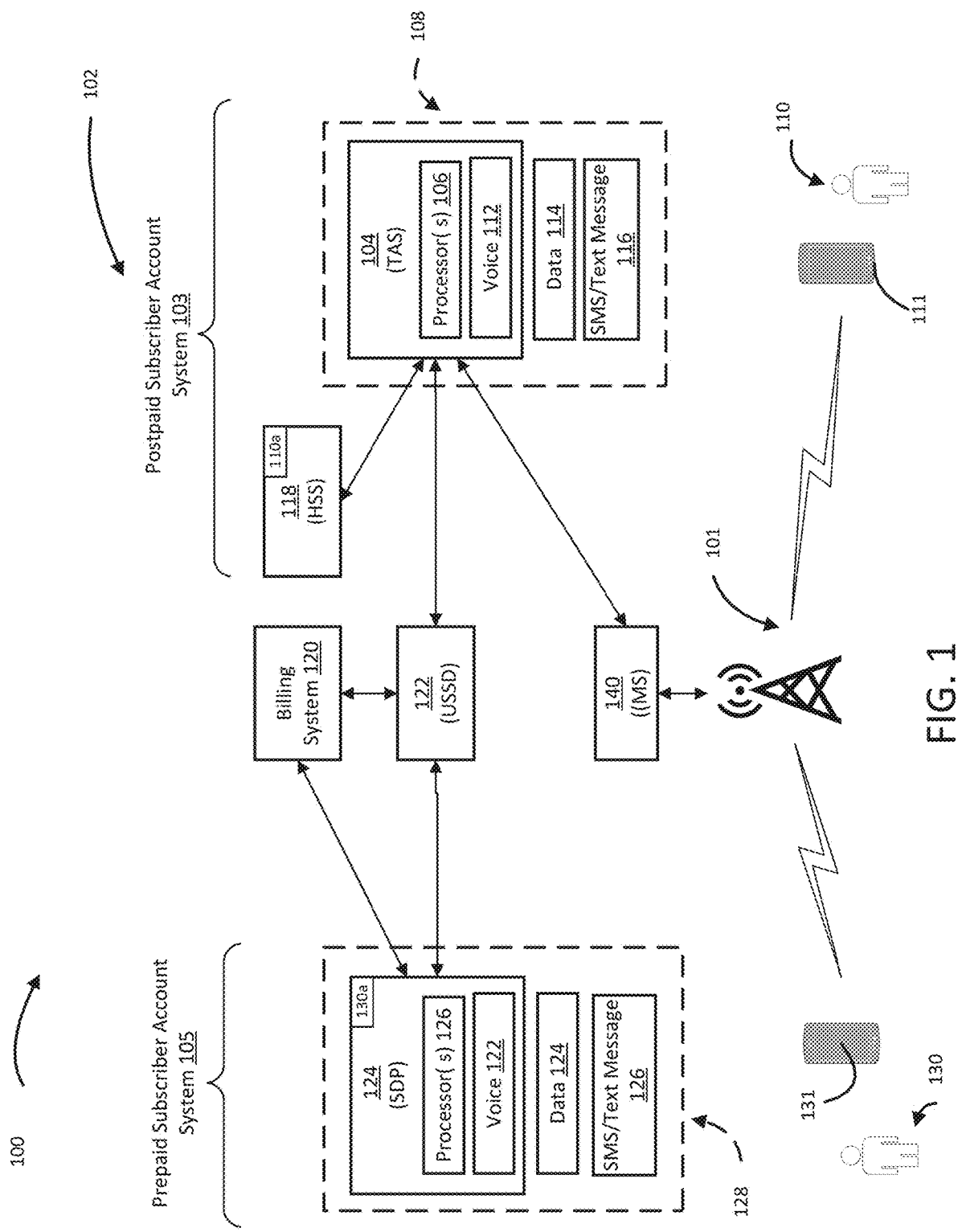
FIG. 1 is a schematic of an embodiment of a subscriber account system for a telecommunications system in accordance with the current disclosure; and, FIG. 2 is a flowchart of a method for transferring cellular services in accordance with the current disclosure.

In a telecommunications system, there may be multiple system components, which handle various functions such as billing, session controls, and the management of cellular services (e.g., the number of minutes or amount of data allotted to a subscriber account) for both prepaid subscribers and postpaid subscribers. Some of these system components are described in turn below.

At a high level, a telecommunications system may include an IP Multmedia Subsystem (IMS). The IMS is a standards-based architectural framework for delivering multimedia communications services such as voice, data, and text messaging over IP networks. The IMS may enable secure multimedia communications between a variety of devices and networks. The telecommunications system may include a Home Subscriber Server (HSS). The HSS may be a central database that stores and maintains all subscriber profile and account information, which may be used to authenticate and authorize subscribers. The HSS may communicate with the network and provide subscriber profile and authentication information.

The telecommunications system may provide core cellular services to postpaid subscribers. For example, the telecommunication subscriber account system may include a Telephony Application Server (TAS). The TAS is a component in the core telecommunications network, which provides telephony application. The TAS may communicate with the HSS and other components of the telecommunications network. Other core cellular services provide SMS/text messaging and data (e.g., 2G/3G, 4G, and 5G).

The telecommunications system may also provide cellular services to prepaid subscribers. For example, the telecommunication subscriber account system may include a Service Data Point (SDP), which handles prepaid calls in the telecommunication network and serves as an account manager for prepaid accounts. The SDP may act as an allowance platform for prepaid subscriber. For example, if there is money on the prepaid subscriber account and a call is made, then the call may be allowed. Once the call is completed, the total call time may be calculated and the cost of the call may be deducted from the prepaid subscriber's account balance. The SDP may also handle the account management for data (e.g., 2/3G, 4G, and 5G) and SMS/text messaging used by the prepaid subscriber.

The telecommunication system may also have an Online Charging Control (OCC). The OCC is a specialized communications function that enables a telecommunications service provider to charge a subscriber for cellular services in real-time. The OCC may communicate with the SDP to handle subscriber account balances and billing.

The telecommunications system may include one or more billing systems or platforms to handles all aspects of billing including subscriber payments, compliance, and account management.

Furthermore, the telecommunications network may utilize Unstructured Supplementary Service Data (USSD) as a communications protocol for communication between various system components including those described above.

Traditionally, prepaid and postpaid subscriber accounts may be managed under separate systems, which do not communicate with one another. This lack of communication may result in underutilized or wasted voice call minutes, SMS/text messaging, and data usage by postpaid subscribers, as well as lack of access to or options for purchasing cellular services by prepaid subscribers. In addition, there may have been no technical way for subscribers who needed cellular services to obtain them from other subscribers. Similarly, there may have been no technical way for subscribers to sell excess or unused cellular services. Finally, there may be no technical way to shop the bid and asks for buying and selling cellular services. Therefore, there exists a need to be provide a cellular service exchange to enable postpaid subscribers the ability to sell and transfer cellular services to prepaid subscribers in exchange for money from a prepaid subscriber's account.

Although the descriptions below may be directed to an exemplary implementation of a telecommunication network having both postpaid and prepaid subscribers, the techniques described therein are applicable to other systems that may require a user or subscriber exchange.

FIG. 1 illustrates a high-level exemplary telecommunications system 100 having a network 101 and a subscriber account system 102 for implementing a subscriber exchange.

The subscriber account system 102 may comprise a postpaid subscriber account system 103 and a prepaid subscriber account system 105.

The postpaid subscriber account system 103 may comprise a postpaid cellular service system 104. The postpaid cellular service system 104 may comprise one or more servers or databases. In one embodiment, the postpaid cellular service system 104 may be a TAS. The postpaid cellular service system 104 may include one or more processors 106 that may be configured to execute computer executable instructions.

The postpaid subscriber account system 103 may provide one or more cellular services 108 to one or more postpaid subscribers 110, which may be associated with one or more postpaid subscriber accounts 110a. The one or more cellular services 108 may include voice call minutes 112, data 114 (e.g., 2G/3G, 4G, or 5G), and/or SMS/text messaging 116.

The one or more postpaid subscribers 110 may be associated with one or more first user devices 111. The one of more first user devices 111 may be a cell phone, smart phone, laptop, tablet, or other computing device.

The postpaid cellular service system 103 may be in communication with a postpaid subscriber account management system 118. The postpaid subscriber account management system 118 may store or provide account information including account balance information, compliance, and authorization information for the one or more postpaid accounts associated with the postpaid subscribers 110. The postpaid subscriber accounts 110a may be stored in the postpaid subscriber account management system 118. In one embodiment, the postpaid subscriber account management system 118 is a HSS.

The postpaid cellular service system 103 may be in communication with a billing system 120. The postpaid billing system 120 may be responsible for adding or subtracting a number of minutes, an amount of data, and/or an amount of SMS/text messaging from a postpaid subscriber's account based on a requested transaction. The postpaid billing system 120 may also credit or deduct a monetary amount to the postpaid subscriber's account based on a requested transaction.

The postpaid cellular service system 103 may communicate to the postpaid subscriber account management system 118 and the postpaid billing system 120 via a communications protocol 122. In one embodiment, the communications protocol is USSD.

The prepaid subscriber account system 105, may comprise a prepaid cellular service system 124. The prepaid cellular service system 124 may be comprised of one or more prepaid cellular service servers and/or databases. The one or more servers may include one or more processors 126 that may be configured to execute computer executable instructions. In one embodiment, the prepaid cellular service system 124 may be a SDP.

The prepaid subscriber account system 105 may provide one or more cellular services 128 to one or more prepaid subscribers 130, which may be associated with one or more prepaid subscriber accounts 130a. The one or more cellular service 128 may include voice call minutes 122, data 124 (e.g., 2G/3G, 4G, or 5G), and/or SMS/text messaging 126. The one or more prepaid subscriber accounts 130a may be stored in the prepaid cellular service system 124.

The one or more prepaid subscribers 130 may be associated with one or more second user devices 131. The one of more second user devices 131 may be a cell phone, smart phone, laptop, tablet, or other computing device.

The prepaid cellular service system 124 may be in communication with the billing system 120. The billing system 120 may be responsible for adding or subtracting a number of minutes, an amount of data, and/or an amount of SMS/text messaging from a prepaid subscriber's account based on a requested transaction. The billing system 120 may also credit or deduct a monetary amount to the prepaid subscriber's account based on a requested transaction. In one embodiment, the billing system 120 is comprised of two sub-billing systems: a first sub-billing system that handles billing for postpaid subscribers 110 and a second sub-billing system that handles billing for prepaid subscribers 130.

The prepaid cellular service system 124 may communicate to the prepaid billing system 120 via the communications protocol 122.

The telecommunications system 100 may provide a cellular service exchange to its prepaid and postpaid subscribers 110 and 130, respectively. In one embodiment, a postpaid subscriber 110 may initiate a request via user first device 111 to transfer an amount of cellular services (e.g., 10 voice call minutes) for a monetary fee (e.g., $3) to a prepaid subscriber 130. The request may be sent to the postpaid cellular service system 103 via the telecommunications network 101.

The postpaid cellular service system 103 may then communicate the request to postpaid subscriber account management system 118 to confirm that the postpaid subscriber has the amount of cellular services requested for transfer in their account. If the cellular services are available, the postpaid cellular service system 103 may communicate a USSD message to the prepaid cellular service system 124. The prepaid cellular service system 124 may confirm whether the prepaid user's account has enough funds to pay for the requested cellular services. If the prepaid user's account has enough funds to cover the requested cellular service, then a USSD acceptance message may be sent to the postpaid subscriber cellular service system 103.

Upon receipt of the acceptance message, the billing system 120 may deduct the cellular services from the postpaid subscribers account (e.g., 10 voice minutes) and may credit the postpaid subscriber's account with the appropriate monetary amount (e.g., $3). The prepaid cellular service system 124 may credit the prepaid subscriber's account with the requested cellular services (e.g., 10 voice minutes) and may send a confirmation to the prepaid subscriber 130 that their account has been credited with the cellular services requested. Similarly, the postpaid subscriber cellular service system 103 may send a message to the postpaid subscriber 110 that the monetary amount for the transferred cellular services has be credited to their account.

Figure 2:
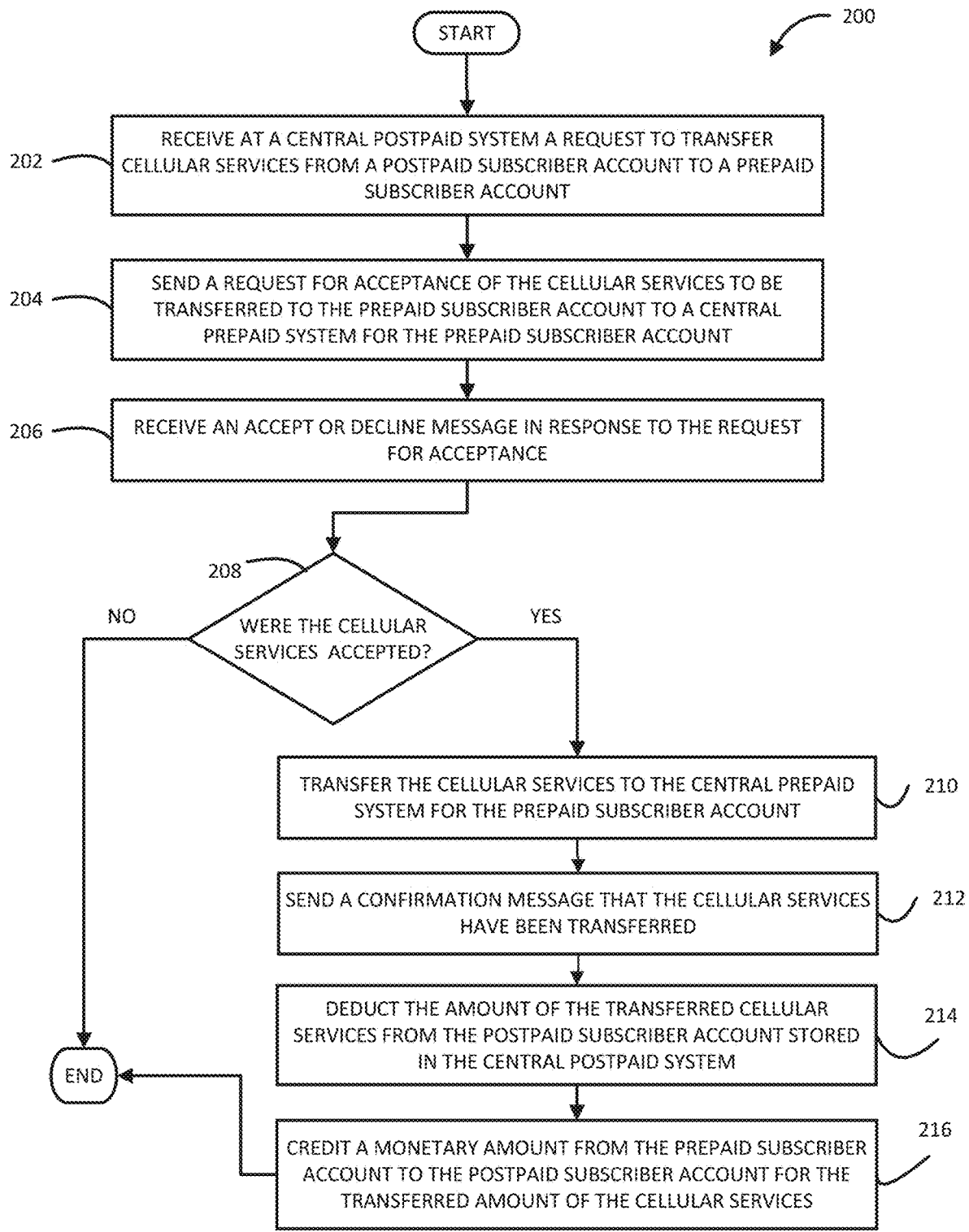

FIG. 2 is a flowchart of an exemplary method 200 for transferring access to cellular services from a postpaid subscriber account (e.g., 110*a*) to a prepaid subscriber account (e.g., 130*a*). At a block 202, a central postpaid system (e.g., postpaid subscriber account system 103) may receive a request to transfer cellular services from a postpaid subscriber account to a prepaid subscriber account. The central postpaid system may comprise a single server or database or a network of servers and databases.

In one embodiment, the request to transfer cellular services may originate with a first user device (e.g., 111) associated with a postpaid subscriber account (110*a*). For example, a postpaid subscriber with cellular services (e.g., minutes, data, or SMS/text) may communicate an alert that cellular services are available for purchase, which a prepaid subscriber may then answer with a request to buy one or more of the cellular services offered. The alert may include the amount and type of cellular services available (e.g., 8 minutes of voice call minutes) and the cost for the cellular services (e.g., $1/min). The alert may include one or more types of cellular services (e.g., voice call minutes, SMS/text, and/or data) that are being offered at one or more price points (e.g., $0.75 per voice call minute, $1 per SMS/text, $10 per 1 GB of data). In another embodiment, the request to transfer cellular services may originate with a second user device associated with prepaid subscriber account system that a postpaid subscriber with cellular services to transfer may respond to. For example, a prepaid subscriber in need of cellular services (e.g., minutes, data, or SMS/text) may communicate a call for cellular services available for purchase, which one or more postpaid subscribers may answer with their cellular service offerings. In one embodiment, the prepaid subscriber may indicate how much they are offering to pay for each cellular service they are in need of (e.g., $0.50 per voice call minute, $0.80 for SMS/text, and/or $1 per 10 MB of data).

At a block 204, a request for acceptance of the cellular services to be transferred to the prepaid subscriber account may be communicated to a central prepaid system (e.g., prepaid subscriber account system 105) for the prepaid subscriber account. The request for acceptance may include the type of cellular services, the amount of cellular services, and/or the cost of the cellular services to be transferred. In addition, the central prepaid system may comprise a single server or database or a network of servers and databases.

In one embodiment, if the postpaid subscriber has 12 voice call minutes available for sale, the prepaid subscriber may accept/buy all 12 voice call minutes or some other amount, e.g., 1 minute, 2 minutes, 4 minutes, etc., up to 12 minutes. In another embodiment, the prepaid subscriber may need 20 voice call minutes and the postpaid subscriber only has 12 minutes for sale, then the prepaid subscriber may accept/buy all 12 voice call minutes from that postpaid subscriber and then may accept/buy the other 8 voice call minutes from another postpaid subscriber. In another embodiment, the postpaid subscribe may have 15 minutes of voice call minutes available for sale and 1 GB of data. A prepaid subscriber may need 10 voice call minutes and 2 GB of data. The prepaid subscriber may therefore accept/buy only 10 voice call minutes and all the data offered by the postpaid subscriber and then may look to purchase another 1 GB of data from another postpaid subscriber. The ability to mix and match the amounts and types of cellular services provides additional flexibility to the system.

In some embodiments, a central server may accept and list offers to sell cellular services and may accept and list offers to buy cellular services. The central server may work automatically to match buyers and sellers of cellular services. In other embodiments, the central server may display offers for sale and the buyer may select one of the offers for sale that is most appropriate. In yet another aspect, the desire to buy call services may be listed and users may review and accept the offer to sell call services. In yet an additional aspect, the desire to buy or sell call services may be communicated to cellular service subscribers who may have opted in to receive such communications.

In yet another aspect, the central server may communicate with apps operating on the various user devices. Instead of having to log-in to a central server, the app on a portable computing device may display the offers for sale or offers to buy and the transactions may be completed in a distributed fashion where the central server acts in an accounting type of roll. In any of the embodiments, a bid and ask type of auction may be executed or a floor or ceiling may be established.

At a block 206, an accept or a decline message may be sent in response to the request for acceptance. In one embodiment, the accept or decline message may be sent by a second user device (e.g., 131) associated with the prepaid subscriber account (130*a*). In another embodiment, the accept or decline message may be sent by a first user device (e.g., 111) associated with the postpaid subscriber account (e.g., 110*a*) either alone or in addition to the accept or decline message sent by the second user device.

At a block 208, whether the cellular services were accepted may be determined. If the cellular services were declined, then the method may exit. For example, the cellular services may be declined because the prepaid subscriber changed their mind and no longer needs the cellular services or found a less expensive option. In another embodiment, the cellular services may also be declined because the prepaid subscriber does not have the enough money in their account to pay for the cellular services requested. In further embodiments, the cellular services may be declined because the postpaid subscriber does not have the requested cellular services available or has found another buyer.

If the cellular services are accepted, then the method may proceed to a block 210. At block 210, the cellular services are transferred to the central prepaid system for the prepaid subscriber account. For example, if the prepaid subscriber purchases 20 voice call minutes from the postpaid subscriber, then the prepaid subscriber's account may be credited 20 voice call minutes. In another embodiment, if the prepaid subscriber purchases 4 minutes of voice calls and 100 MB of data, then the prepaid subscriber's account may be credited with 4 minutes of voice calls and 100 MB of data.

In one embodiment, the prepaid subscriber may be required to use the purchased cellular services within a specific time frame, e.g., 15 days after purchase, 30 days after purchase, etc.). In another embodiment, the prepaid subscriber may not be subject to any time restrictions and may use the purchased cellular services at any time. In a further embodiment, time restrictions with respect to use of the purchased cellular services may be enacted as to some of the cellular services (e.g., 15 days to use data), but not to other cellular services (e.g., no time limit to use voice call minutes).

At a block 212, a confirmation message may be communicated indicating that the cellular services have been transferred. The message may be communicated to the first user device associated with the postpaid subscriber account, and/or the message may be communicated to the second user device associated with the prepaid subscriber account.

At a block 214, the amount of the transferred cellular services may be deducted from the postpaid subscriber account stored in the central postpaid system. For example, if the postpaid subscriber offered 15 voice call minutes for sale and the prepaid subscriber purchased all 15 minutes, then the postpaid subscriber account may be deducted 15 minutes, leaving 0 voice call minutes available to the postpaid subscriber for the relevant billing period. If, on the other hand, the prepaid subscriber only purchases 10 minutes, then the postpaid subscriber's account may only be deducted 10 minutes, leaving the postpaid subscriber with 5 voice call minutes left for the relevant billing period, which the postpaid subscriber may use, forfeit, or try to sell on the exchange.

At a block 216, a monetary amount from the prepaid subscriber account may be credited to the postpaid subscriber account for the transferred amount of cellular services. For example, in one embodiment, if the prepaid subscriber has $25 in their account and they purchase $8 of voice call minutes from the postpaid subscriber, then $8 may be credited to the postpaid subscriber's account and $8 may be deducted from the prepaid subscriber's account (leaving $15 in the prepaid subscriber's account). In another embodiment, if the prepaid subscriber has $20 in their account and they purchase $5 of data and $6 of SMS/text messaging then the postpaid subscriber's account would be credited $11 and $11 would be deducted from the prepaid subscriber's account.

Once the postpaid subscriber's account is credited for the monetary amount of the cellular services, the method may end.

The current method and systems disclosed herein are beneficial to both postpaid subscribers and prepaid subscribers. In the past, there was no technical solution on how to transfer cellular services between subscriber, especially between prepaid and postpaid systems. The described system and method provides a technical solution to this technical problem.

In accordance with the provisions of the patent statutes and jurisprudence, exemplary configurations described above are considered to represent one embodiment of the disclosure. However, it should be noted that the teachings of the disclosure can be practiced otherwise than as specifically illustrated and described without departing from its spirit or scope.

The computing devices, computers, routers, and servers described herein may be computers that may have, among other elements, a microprocessor (such as from the Intel Corporation, AMD or Motorola); volatile and non-volatile memory; one or more mass storage devices (e.g., a hard drive); various user input devices, such as a mouse, a keyboard, or a microphone; and a video display system. The user computing devices, computers, and servers described herein may be running on any one of many operating systems including, but not limited to WINDOWS, UNIX, LINUX, MAC OS, or Windows (XP, VISTA, etc.). It is contemplated, however, that any suitable operating system may be used for the present disclosure. The servers may be a cluster of web servers, which may each be LINUX based and supported by a load balancer that decides which of the cluster of web servers should process a request based upon the current request-load of the available server(s).

The computing devices, computers, routers, and servers described herein may communicate via communications networks, including the Internet, WAN, LAN, Wi-Fi, cellular, or other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described figures, including any servers, point of sale terminals, computing devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a harddrive or a floppy disk, or an optical medium such as a CD-ROM. Any such computer readable medium may reside on or within a single computational apparatus and may be present on or within different computational apparatuses within a system or network.

It may be understood that the present disclosure as described above can be implemented in the form of control logic using computer software in a modular or integrated manner. Based on the disclosure and teachings provided herein, a person of ordinary skill in the art may know and appreciate other ways and/or methods to implement the present disclosure using hardware, software, or a combination of hardware and software.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow diagram, a narrative, and/or in any other manner that provides sufficient structure for those of ordinary skill in the art to implement the recited process and its equivalents.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment. One or more features from any embodiment may be combined with one or more features of any other embodiment without departing from the scope of the disclosure. A recitation of "a", "an" or "the" is intended to mean "one or more" unless specifically indicated to the contrary. Recitation of "and/or" is intended to represent the most inclusive sense of the term unless specifically indicated to the contrary.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A computer-implemented method for transferring cellular services from a postpaid subscriber account to a prepaid subscriber account, the method comprising the steps of:
   receiving, via one or more processors of a prepaid cellular service system, a request for cellular services available for purchase from a first user device associated with a prepaid subscriber having a prepaid subscriber account over a telecommunications network;
   communicating, via the one or more processors of the prepaid cellular service system to one or more processors of a postpaid cellular service system using a telecommunications protocol, the request for cellular services;
   communicating, via the one or more processors of the postpaid cellular service system, the request for cellular services to a plurality of user devices associated with postpaid subscribers who have opted in to receiving requests for cellular services over the telecommunications network;
   receiving, via the one or more processors of the postpaid cellular service system, an answer to the request for cellular services from at least one of the user devices of the plurality of postpaid subscribers, wherein the answer includes the amount of cellular services offered by the at least one of the plurality of postpaid subscribers, and wherein the at least one of the plurality of postpaid subscribers is associated with the postpaid subscriber account;
   communicating, via the one or more processors of the postpaid cellular service system to the one or more processors of a prepaid cellular service system using the telecommunications protocol, the answer to the request for cellular services;
   receiving, via the one or more processors of the prepaid cellular service system, from the first user device of the prepaid subscriber an acceptance to purchase a portion of the amount of cellular services offered in the answer by the at least one of the plurality of postpaid subscribers over the telecommunications network;
   receiving, via one or more processors of a postpaid account management system, a request to transfer the portion of cellular services accepted by the prepaid subscriber from the postpaid subscriber account to the prepaid subscriber account;
   transferring the portion of cellular services from the postpaid subscriber account to a prepaid account management system for the prepaid subscriber, wherein transferring comprises:
      deducting, via one or more processors of a billing system, the transferred cellular services from the postpaid subscriber account; and
      crediting, via the one or more processors of the billing system, a monetary amount from the prepaid subscriber account to the postpaid subscriber account for the transferred cellular services.

2. The method of claim 1, wherein the cellular services comprise at least one of data, SMS/text messaging, and voice minutes.

3. The method of claim 1, wherein the postpaid account management system and the prepaid account management system are part of the telecommunications network.

4. The method of claim 1, wherein the request to transfer the portion of cellular services accepted by the prepaid subscriber from the postpaid subscriber account to the prepaid subscriber account includes one or more types of cellular services, an amount of each type of cellular service, and a price for each type of cellular service.

5. The method of claim 1, further comprising:
sending a request for acceptance of the cellular services offered by the at least one of the plurality of postpaid subscribers to the prepaid cellular service system.

6. The method of claim 5, further comprising:
receiving an acceptance message or a decline message in response to the request for acceptance of the cellular services.

7. The method of claim 1, further comprising:
sending a confirmation message that the cellular services have been transferred.

8. The method of claim 7, wherein the confirmation message is sent to the postpaid account management system.

9. A processor-readable tangible non-transitory medium storing processor-issuable instructions configured to cause one or more processors to:
receive, via a prepaid cellular service system, a request for cellular services available for purchase from a first user device associated with a prepaid subscriber having a prepaid subscriber account over a telecommunications network;
communicate to a postpaid cellular system using a telecommunications protocol the request for cellular services;
communicate to the postpaid cellular service system, the request for cellular services to a plurality of user devices associated with postpaid subscribers who have opted in to receiving requests for cellular services available for purchase over the telecommunications network;
receive, from the postpaid cellular service system, an answer to the request for cellular services from at least one of the user devices of the plurality of postpaid subscribers, wherein the answer includes the amount of cellular services offered by the at least one of the plurality of postpaid subscribers, and wherein the at least one of the plurality of postpaid subscribers is associated with a postpaid subscriber account;
communicate to the prepaid cellular service system using the telecommunications protocol the answer to the request for cellular services;
receive, via the prepaid cellular service system, from the first user device of the prepaid subscriber an acceptance to purchase a portion of the amount of cellular services offer in the answer by the at least one of the plurality of postpaid subscribers over the telecommunications network;
receive at a postpaid account management system a request to transfer the portion of cellular services accepted by the prepaid subscriber from the postpaid subscriber account to the prepaid subscriber account;
transfer the portion of cellular services from the postpaid subscriber account to a prepaid account management system for the prepaid subscriber account, wherein transfer comprises;
deduct, via a billing system, the transferred cellular services from the postpaid subscriber account; and
credit, via a billing system, a monetary amount from the prepaid subscriber account to the postpaid subscriber account for the transferred cellular services.

10. The processor-readable tangible non-transitory medium of claim 9, wherein the cellular services comprise at least one of data, SMS/text messaging, and voice minutes.

11. The processor-readable tangible non-transitory medium of claim 9, wherein the request to transfer the portion of cellular services accepted by the prepaid subscriber from the postpaid subscriber account to the prepaid subscriber account includes one or more types of cellular services, an amount of each type of cellular service, and a price for each type of cellular service.

12. A system for transferring access to cellular services from a postpaid subscriber account to a prepaid subscriber account, the system comprising:
a network;
a prepaid cellular service system in communication with the network, wherein the prepaid cellular service system has a prepaid server configured to;
receive a request for cellular services available for purchase from a first user device associated with the prepaid subscriber account over the network;
communicate to a postpaid cellular service system using a telecommunications protocol the request for cellular services;
the postpaid cellular service system in communication with the prepaid cellular services system via the network, wherein the central postpaid system has a postpaid server configured to:
communicate the request for cellular services to a plurality of user devices associated with postpaid subscribers who have opted in to receiving requests for cellular services available for purchase over the network;
receive, over the network, an answer to the request for cellular services from at least one of the user devices of the plurality of postpaid subscribers, wherein the answer includes the amount of cellular services offered by the at least one of the plurality of postpaid subscribers, and wherein the at least one of the plurality of postpaid subscribers is associated with the postpaid subscriber account;
communicate to the prepaid cellular service system using the telecommunications protocol the answer to the request for cellular services;
receive a request to transfer the portion of cellular services accepted by the prepaid subscriber from the postpaid subscriber account to the prepaid subscriber account over the network;
a billing system in communication with the prepaid cellular service system and the postpaid cellular service system, the billing system having a server configured to:
deduct the transferred cellular services from the postpaid subscriber account; and
credit a monetary amount from the prepaid subscriber account to the postpaid subscriber account for the transferred cellular services.

13. The system of claim 12, wherein the cellular services comprise at least one of data, SMS/text messaging, and voice minutes.

14. The system of claim 12, wherein the network is a telecommunications network.

15. The system of claim 12, wherein the request to transfer the portion of cellular services accepted by the prepaid subscriber from the postpaid subscriber account to the prepaid subscriber account includes one or more types of cellular services, an amount of each type of cellular service, and a price for each type of cellular service.

16. The system of claim 12, wherein the postpaid server is further configured to:
send a request for acceptance of the cellular services offered by the at least one of the plurality of postpaid subscribers to the prepaid cellular service system.

17. The system of claim 16, wherein the postpaid server is further configured to:

receive an acceptance message or a decline message in response to the request for acceptance of the cellular services.

18. The system of claim 12, wherein the postpaid server is further configured to:
send a confirmation message that the cellular services have been transferred.

19. The system of claim 18, wherein the confirmation message is sent to the postpaid server.

\* \* \* \* \*